US009475442B2

(12) United States Patent
Lang

(10) Patent No.: US 9,475,442 B2
(45) Date of Patent: Oct. 25, 2016

(54) METHOD AND DEVICE FOR TRIGGERING AT LEAST ONE PASSENGER PROTECTION MEANS OF A VEHICLE

(71) Applicant: Robert Bosch GmbH, Stuttgart (DE)

(72) Inventor: Gunther Lang, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/608,991

(22) Filed: Jan. 29, 2015

(65) Prior Publication Data

US 2015/0224951 A1 Aug. 13, 2015

(30) Foreign Application Priority Data

Feb. 13, 2014 (DE) ........................ 10 2014 202 666

(51) Int. Cl.
*B60R 21/01* (2006.01)
*B60R 21/013* (2006.01)

(52) U.S. Cl.
CPC .... *B60R 21/013* (2013.01); *B60R 2021/01013* (2013.01); *B60R 2021/01204* (2013.01); *B60R 2021/01308* (2013.01)

(58) Field of Classification Search
CPC ............ B60R 21/013; B60R 21/0132; B60R 21/0134; B60R 21/0136; B60R 21/01; B60R 21/01302; B60R 21/01306; B60R 21/01308; B60R 2021/01013; B60R 2021/0102; B60R 2021/01027; B60R 2021/01034; B60R 2021/01122; B60R 2021/0104; B60R 2021/01286; B60R 2021/01322; B60R 2021/01325; B60R 2021/01327; B01P 15/16; B01P 15/18

USPC ......... 701/45, 46, 48, 49, 36, 301; 280/734, 280/765; 340/436
See application file for complete search history.

(56) References Cited

U.S. PATENT DOCUMENTS

| 4,836,024 | A | * | 6/1989 | Woehrl | ............... | B60R 21/0132 280/735 |
| 5,173,614 | A | * | 12/1992 | Woehrl | ............... | B60R 21/0132 180/282 |
| 5,389,822 | A | * | 2/1995 | Hora | ............... | B60R 21/0132 280/735 |
| 5,424,583 | A | * | 6/1995 | Spies | ............... | G01P 15/08 180/282 |
| 5,732,374 | A | * | 3/1998 | Ohm | ............... | B60R 21/013 280/735 |

(Continued)

FOREIGN PATENT DOCUMENTS

DE 10 2005 008 977 9/2006

*Primary Examiner* — Thomas Tarcza
*Assistant Examiner* — Richard Goldman
(74) *Attorney, Agent, or Firm* — Norton Rose Fulbright US LLP

(57) ABSTRACT

A method for triggering a passenger protection unit of a vehicle includes: reading in a first and a second sensor signal value of a first sensor, which is situated at a first location in the vehicle; reading in a third and a fourth sensor signal value of a second sensor, which is situated at a second location in the vehicle which is different from the first location; and activating the passenger protection unit using the first, second, third and fourth sensor signal values. The first and third sensor signal values represent a physical variable detected in a first sensor direction, and the second and fourth sensor signal values represent a second physical value detected in a second sensor direction which is different from the first sensor direction.

13 Claims, 5 Drawing Sheets

(56) References Cited

U.S. PATENT DOCUMENTS

| | | | | |
|---|---|---|---|---|
| 5,737,224 A * | 4/1998 | Jeenicke | B60R 21/0132 | 180/271 |
| 5,740,041 A * | 4/1998 | Iyoda | B60R 21/0132 | 180/271 |
| 5,961,562 A * | 10/1999 | Iyoda | B60R 21/0132 | 180/271 |
| 5,995,892 A * | 11/1999 | Kiribayashi | B60R 21/0132 | 280/735 |
| 6,023,664 A * | 2/2000 | Bennet | B60R 21/0132 | 701/45 |
| 6,032,092 A * | 2/2000 | Laaser | B60R 21/0132 | 340/438 |
| 6,070,113 A * | 5/2000 | White | B60R 21/013 | 180/271 |
| 6,216,070 B1 * | 4/2001 | Hayashi | B60R 21/017 | 180/282 |
| 6,249,730 B1 * | 6/2001 | Khairallah | B60R 21/013 | 180/268 |
| 6,292,728 B1 * | 9/2001 | Masegi | B60R 21/0173 | 180/232 |
| 6,300,866 B1 * | 10/2001 | Foith | B60R 21/0132 | 340/436 |
| 6,312,013 B1 * | 11/2001 | Baur | B60R 21/0132 | 280/735 |
| 6,330,500 B1 * | 12/2001 | Moriyama | B60R 21/013 | 180/232 |
| 6,353,782 B1 * | 3/2002 | Kunimi | B60R 21/0132 | 280/735 |
| 6,363,307 B1 * | 3/2002 | Ikegami | B60R 21/0156 | 280/735 |
| 6,487,482 B1 * | 11/2002 | Mattes | B60R 21/013 | 180/271 |
| 6,520,536 B2 * | 2/2003 | Foo | B60R 21/013 | 280/734 |
| 6,540,255 B1 * | 4/2003 | Blank | B60R 21/013 | 280/735 |
| 6,553,295 B1 * | 4/2003 | Bauch | B60R 21/013 | 180/282 |
| 6,595,544 B1 * | 7/2003 | Hermann | B60R 21/013 | 180/274 |
| 6,940,398 B2 * | 9/2005 | Li | B60Q 9/006 | 307/10.1 |
| 7,643,919 B2 * | 1/2010 | Nicaise | B60R 21/0132 | 280/735 |
| 7,840,325 B2 * | 11/2010 | Foo | B60R 21/0132 | 180/282 |
| 8,116,947 B2 * | 2/2012 | Giordano | B60R 21/0132 | 280/728.1 |
| 8,346,438 B2 * | 1/2013 | Breed | B60N 2/0232 | 297/216.12 |
| 8,527,074 B2 * | 9/2013 | Willerton | B60N 2/0232 | 700/1 |

* cited by examiner

METHOD AND DEVICE FOR TRIGGERING AT LEAST ONE PASSENGER PROTECTION MEANS OF A VEHICLE

BACKGROUND OF THE INVENTION

1. Field of the Invention

The present invention relates to a method for triggering at least one passenger protection means of a vehicle, to a corresponding device, and to a corresponding computer program product.

2. Description of the Related Art

In higher-quality vehicles, or markets with higher requirements for restraint systems (for example, USA), so-called upfront sensors (sensors which are attached to the vehicle front side) are installed. These are acceleration sensors sensing in the longitudinal (x) direction (i.e., along the vehicle's longitudinal axis) which are installed in the front end of the vehicle. It is common to install one or two upfront sensors, which, for example, is/are installed at the radiator cross member or at the headlight mountings. Since these sensors are situated in the crumple zone, they detect deformation resulting from a frontal crash very quickly and are thus very suitable for detecting frontal crashes. However, usually they are not used as the sole triggering instance, but influence a triggering algorithm acting on the central sensors of an airbag control device.

Published German patent application DE 10 2005 008 977 A1 describes a method for transmitting sensor data for reliable identification.

BRIEF SUMMARY OF THE INVENTION

The approach presented here creates a method for triggering at least one passenger protection means of a vehicle, the method including the following steps:

reading in a first and a second sensor signal value of a first sensor, which is situated at a first location in the vehicle, and, if necessary, reading in a third and a fourth sensor signal value of a second sensor, which is situated at a second location in the vehicle, which is different from the first location, the first sensor signal value representing a first physical variable detected in a first sensor direction, and the second sensor signal value representing a second physical variable detected in a second sensor direction, which is different from the first sensor direction; and activating the passenger protection means using the first and the second sensor signal value.

A specific embodiment of the present invention is particularly advantageous, in which, furthermore, a third and a fourth sensor signal value is read in by a second sensor, which is situated at a second location in the vehicle, which is different from the first location, the third sensor signal value representing a third physical variable detected in the first sensor direction, and the fourth sensor signal value representing a fourth physical variable detected in the second sensor direction, and the passenger protection means furthermore being activated using the third and fourth sensor signal value in the step of activation.

A passenger protection means may be understood, for example, to mean a device for preventing or reducing an injury of a person in an accident of the vehicle. Such a person may, for example, be a vehicle occupant or a person outside of the vehicle, such as, for example, a pedestrian or a cyclist. Such a passenger protection means may, for example, be an airbag, a seat belt tensioner, an engine hood which may be opened, or a similar device. A sensor signal value may be understood to mean a piece of information about a physical variable, which was detected in a certain sensor direction. A physical variable may, for example, be understood to mean an acceleration, a force, a pressure, or a different, similar physical variable. A sensor direction may be understood to mean a direction in which the physical variable acts during the detection. The first sensor direction may here, for example, be oriented at a right angle to the second sensor direction. The first sensor may be designed as a 2-channel sensor in order to provide a sensor signal value pair from the first and the second sensor signal value from a location at which the first sensor is situated. The second sensor may also be designed as a 2-channel sensor in order to provide a sensor signal value pair from the third and the fourth sensor signal value from a location at which the second sensor is situated. Activating the passenger protection means may, for example, be understood to be the provision of an activation signal which causes a chemical, geometrical or mechanical change of the passenger protection means. For example, activating may be understood to mean the output of an activation signal in order to trigger a squib of an airbag or to activate a magnet or electric motor of a seat belt tensioner.

The approach presented here is based on the finding that by using at least one sensor signal value pair, or better, two sensor signal value pairs, which result from two sensors situated at different locations in the vehicle but which detect signal values in two common sensor directions, an accident situation, in which the vehicle is presently situated, may be detected very precisely. In this way, the passenger protection means may be activated very precisely, for example, regarding a desired triggering force of the passenger protection means or regarding the type and location of the passenger protection means. The approach presented here thus offers the advantage that by using sensors to detect a physical variable (or multiple physical variables) in several detection directions, the analysis of the instantaneous accident scenario of the vehicle may be considerably improved. To achieve this, small technical changes are required, for example, providing for 2-channel sensors instead of 1-channel sensors as was done previously at the respective locations of the sensors in the vehicle. The adaptation of a respective analysis algorithm for analyzing the data of the 2-channel sensors is technically easily implementable, since only one respective algorithm has to be exchanged in an evaluation unit. In summary, the approach presented here offers considerable improvements in assessing or analyzing an accident situation of the vehicle at low additional costs. In this way, a passenger protection means may be activated considerably more precisely or more accurately in order to avoid or prevent the injury of a person during an accident.

A specific embodiment of the present invention is advantageous in which, in the step of reading in sensor signal values, the accelerations are represented as a physical variable. Such a specific embodiment of the present invention offers the advantage that accelerations may be detected using technically simple and yet very precise sensors (also regarding a selected detection direction), such sensors also being able to be installed using very little space.

A specific embodiment of the present invention is also conceivable, in which, during the step of reading in, a physical variable detected in the driving direction of the vehicle is read in as first and/or third sensor signal value(s), and/or a physical variable detected transversely to the driving direction of the vehicle is read in as second and/or fourth sensor signal value(s), or a physical variable detected perpendicularly to a roadway, on which the vehicle is driving, is read in as second and fourth sensor signal value(s).

In addition, according to one other specific embodiment of the present invention, the activation may be carried out on the basis of one or multiple linear combinations of the first, second, third, and/or fourth threshold value(s) in the step of activating. Such a specific embodiment of the present invention offers the advantage of a linkage, which is particularly easily carried out, of the sensor signal values in order to activate the passenger protection means.

A direction of impact of an object on the vehicle may be established easily from the available sensor signal values. In particular, according to an advantageous specific embodiment of the present invention, a first angle signal may be determined using the first and the second sensor signals in the step of activating. Alternatively or additionally, a second angle signal may also be determined using the third and fourth sensor signal value, the passenger protection means being activated based on the first and/or second angle(s). An angle signal may here be understood to mean an angle, a linear combination, or a ratio of linear combinations of physical variables, which represent an angle between the first or second sensor direction and a resulting direction of force, which acts on the vehicle as a result of the impact of the object. Alternatively, an angle signal may here also be understood to mean an angle or a ratio of physical variables or a linear combination of physical variables in a sensing direction to physical variables or a linear combination of physical variables in a different sensing direction.

When using 2-channel sensors, an angular impact of the object on the vehicle may be detected technically very easily when the available sensor signal values or the intermediate values formed thereof are combined with different threshold values. A specific embodiment of the present invention is particularly advantageous, where in the step of activating, an angular impact of an object on the vehicle is detected when the first angle signal and/or the second angle signal is/are in a predetermined correlation with an angle signal threshold value, particularly when a difference between the first angle signal and the second angle signal is in a predetermined correlation with an angle signal detection threshold value.

A specific embodiment of the present invention is furthermore advantageous, where an angular impact of an object on the vehicle is detected in the step of activating when the first angle signal is in a predetermined correlation with a reference threshold value. Alternatively or additionally, an angular impact of an object on the vehicle may be detected in the step of activating, when a negated second angle signal is in a predetermined correlation with a reference threshold value and/or when a linear combination of the first, second, third and fourth sensor signal values is in a predetermined correlation with an additional reference threshold value. Such a specific embodiment of the present invention offers a very accurate possibility of ascertaining an angular impact.

According to one other specific embodiment of the present invention, a pole impact of an object on the vehicle may be detected in the step of activating when the first angle signal is in a predetermined correlation with a first angle signal threshold value and a negated second angle signal is in a predetermined correlation with a second angle signal threshold value. For example, the angle or the angle signal may be larger or smaller than the first angle signal threshold value.

A negated second angle signal may be understood to mean that the second angle has a negative sign. A predetermined correlation between the negated second angle signal and the second angle signal threshold value may be understood to mean a correlation in which the second angle is larger or smaller than the second angle threshold value. Alternatively or additionally, a pole impact of an object on the vehicle may be detected when a quotient from a difference between the second and fourth sensor signal value and a sum of the first and third sensor signal value(s) is in a predetermined correlation with a sum threshold value, the passenger protection means being activated as a reaction to the detected pole impact. A predetermined correlation with the sum threshold value may be understood to mean a correlation in which the quotient is larger or smaller than the sum threshold value. Such a specific embodiment of the present invention offers the advantage that a pole impact of the object on the vehicle may be detected very precisely through simple algebraic combinations of the available sensor signal values.

A specific embodiment of the present invention is furthermore advantageous in which, in the step of activating, the first and third sensor signal values are linked to form a first combined value, and the second and fourth sensor signal values are linked to form a second combined value, the passenger protection means being activated based on the first and/or second combined value(s). Such a specific embodiment of the present invention offers the advantage that sensor signal values, which were detected in a same sensor direction but from different detection positions in the vehicle, may be linked with each other in order to enable a very accurate analysis of the instantaneous accident event. In this way, the one or multiple relevant passenger protection means may be precisely adjusted and/or triggered or activated.

In order to determine a direction of the force effect caused by the impact of the object on the vehicle as easily as possible in the step of activating to infer the instantaneous accident event, a combination ratio or a combination angle using the first and second combined value may be determined according to one specific embodiment of the present invention, the passenger protection means being activated based on the combination ratio or the combination angle.

With the sensor signal values provided by the 2-channel sensors, an impact intensity of the object on the vehicle may also be ascertained in one impact direction and used for activating one or multiple passenger protection means. In this context, a specific embodiment of the present invention is advantageous, in which in the step of activating, the passenger protection means is activated on the basis of a sensor signal strength value, the sensor signal strength value being determined, in particular, using a square root of a sum of the squared first sensor signal value and the squared third sensor signal value, and/or using a square root of a sum of the squared second sensor signal value and the squared fourth sensor signal value, and/or using a square root of a sum of the squared sum of the first and third sensor signal values and the squared sum of the second and fourth sensor signal values.

The approach presented here furthermore provides a device which is designed to carry out all steps of one variant of a method presented here. Also as a result of this embodiment variant of the present invention in the form of a device, the underlying object of the present invention may be achieved quickly and efficiently.

In the present case, a device may be understood to mean an electrical device which processes sensor signals and outputs control and/or data signals as a function thereof. The device may include an interface which may be designed as hardware and/or software. In a hardware design, the interfaces may, for example, be part of a so-called system ASIC, which includes various functions of the device. However, it is also possible that the interfaces are dedicated integrated circuits or are made, at least in part, of discrete components. In a software design, the interfaces may be software modules, which, for example, are present on a microcontroller together with other software modules.

Also advantageous is a computer program product including program code which may be stored on a machine-readable medium such as a semiconductor memory, a hard disk memory or an optical memory and is used for carrying out the method according to one of the previously described specific embodiments when the program is executed on a computer or a device. Thus the approach presented here provides a computer program, which is designed to carry out all steps of one variant of a method presented here. A machine-readable storage medium is also advantageous here, having a computer program stored thereon, in particular for carrying out one variant of a method presented here.

DETAILED DESCRIPTION OF THE INVENTION

Figure 1:
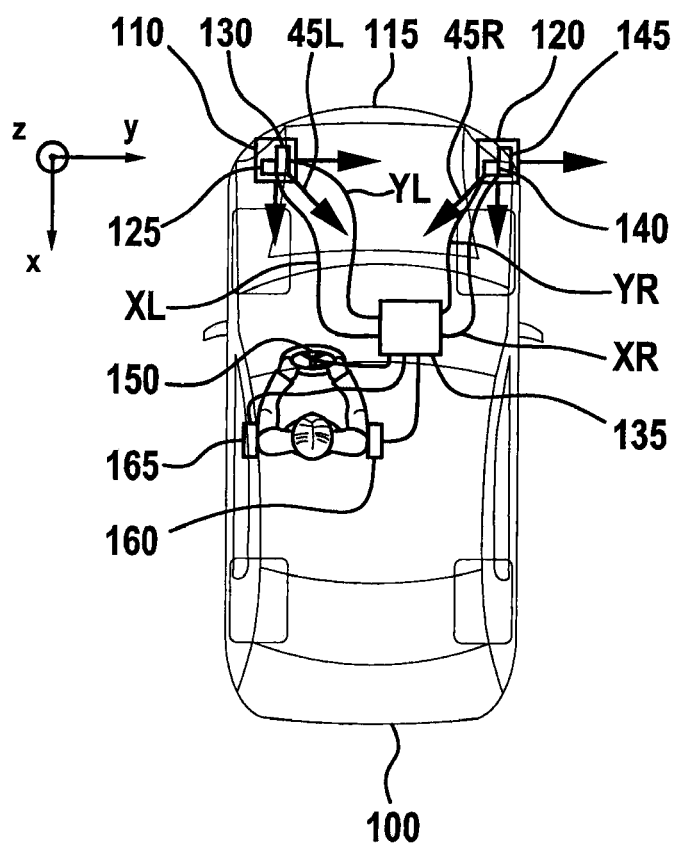
FIG. 1 shows a block diagram of a vehicle for use with a device according to one exemplary embodiment of the present invention, as well as the definition of the sign convention used in the following.

In the following description of advantageous exemplary embodiments of the present invention, the elements which are illustrated in the various figures and appear to be similar are identified with identical or similar reference numerals; a repetitive description of these elements is dispensed with.

FIG. 1 shows a block diagram of a vehicle 100, in which a first sensor 110 is situated at a left side of vehicle front 115. Furthermore, a second sensor 120 is situated at a right side of vehicle front 115. First sensor 110 has a first measuring element 125 and a second measuring element 130. First measuring element 125 is designed to detect a physical variable, here an acceleration, in the longitudinal direction. Here, the longitudinal direction forms the first sensor direction, which represents the x direction or the (inverted or negated) driving direction of vehicle 100 in the diagram of FIG. 1. First measuring element 125 thus provides first sensor signal value XL, which is supplied to an analyzing or activation unit 135. Similarly, second measuring element 130 detects a physical variable, here also an acceleration, which is now detected in lateral direction y of vehicle 100 (which is referred to as the second sensor direction). Second measuring element 130 then supplies second sensor signal value YL to activation unit 135. First measuring element 125 and second measuring element 130 respectively measure a physical variable in first sensor direction x and second sensor direction y, first sensor direction x and second sensor direction y being situated at right angles to one another.

Second sensor 120 includes a third measuring element 140 and a fourth measuring element 145; third measuring element 140 is designed to detect a physical variable, here again an acceleration, in the first sensor direction (meaning the longitudinal direction X of vehicle 100) and to transmit a corresponding third sensor signal XR to activation unit 135. Similarly, fourth measuring element 145 is designed to receive a physical variable, here also an acceleration, in the second sensor direction (which again forms the lateral Y direction of vehicle 100) and to transmit a corresponding fourth sensor signal YR to activation unit 135. Second sensor 120 is here situated at a different position than first sensor 110 on vehicle 100, but provides sensor signal values YR and XR, which were detected in the same sensor directions as first and second sensor signal values XL and YL.

According to the following more detailed description, first sensor signal value XL, second sensor signal value YL, third sensor signal value XR and fourth sensor signal value YR may now be analyzed in activation unit 135, in order to activate or trigger a passenger protection means 150, for example, a driver airbag. Alternatively or in addition, one other passenger protection means, for example, a seat belt tightener 160 or a side airbag 165 may, for example, be activated.

The designations of the individual sensor channels as well as the sensor direction convention are indicated in the diagram of FIG. 1 for biaxial upfront sensors (i.e. 2-channel upfront sensors). For example, in first sensor 110 a measurement of the acceleration index in the direction toward the vehicle is interpreted as a positive acceleration, and an acceleration in the Y direction to the right is also interpreted as a positive acceleration. In the case of second sensor 120, an acceleration in the index direction toward the vehicle is interpreted as a positive acceleration, and an acceleration in the Y direction away from the vehicle is classified as a positive acceleration. This explains only the sensing direction convention for the following designs; the actual installation of the sensors may deviate, and individual or all sensor channels 125, 130, 140, 145 may be installed in the vehicle in an inverted manner to the diagram in FIG. 1. Such a case is easily taken into account with a correction of the algebraic sign in one of the following processing steps. In addition, in each of sensors 110 and 120, a combination of the two sensor signal values may be determined in activation unit 135, which then plots an acceleration at a specific angle to the first central second sensor direction. For example, from first sensor signal value XL and second sensor signal value YL, an angle component 45L of the acceleration acting on first sensor 110 may be formed, as shown in FIG. 1. Similarly, third sensor signal value XR and fourth sensor signal value YR may be used to ascertain an angle component 45R, which is also shown in FIG. 1. According to the convention chosen here, angle component 45R has a negative portion of the second sensor direction (i.e., the lateral Y direction of vehicle 100).

It is also conceivable that first sensor 110 and second sensor 120 do not detect the sensor signal values in the x-y plane, but instead, for example, in an x-z plane, the z direction, for example, representing a normal onto the roadway on which vehicle 100 travels in normal driving operation. The z direction thus forms a vertical axis of vehicle 100.

By using 2-channel upfront sensors, which either sense in the x-y plane or in the x-z plane, the detection of crashes with acceleration components in the y direction or the z direction is to be improved.

When 2-channel upfront sensors are installed in the x-y direction, they allow for an improved detection of crashes with a strong y component (angular crash at 30° or Small Overlap Test) or of crashes having a significant surface deformation in the y direction (central pole crash).

When 2-channel upfront sensors are installed in the x-z direction, they allow for an improved detection of crashes with a z component (truck underrides) or an improved detection of misuse tests such as driving over a curb, pothole tests, etc., during which there is a z movement of the vehicle.

By using 2-channel upfront sensors with measuring axes vertically on top of one another, the acting force may not only be detected in one (i.e., longitudinal) direction, but may be measured in two directions, and thus the force vector may be effectively ascertained in the measuring plane defined by the installation of the upfront sensors.

The advantage of the approach presented here lies in the fact that a force vector enables a more precise determination of the crash type and crash severity compared to a one-dimensional measurement in the longitudinal direction. This, in turn, allows an improved compromise between triggering performance during the crash (optimized triggering times) and robustness in non-triggering-situations. A precise detection of the crash type improves an adaptive control of restraint means, for example, the additional triggering of curtain airbags 165 (head airbags) in angular frontal crashes.

The advantages of the approach presented here apply to both upfront sensor systems having only one UFS (i.e. installation of a 2-channel upfront sensor in the vehicle center, for example, in the center on the radiator cross member) as well as to upfront sensor systems having two UFS (installation of two 2-channel upfront sensors at the lateral vehicle periphery).

In the directly following description, the approach presented here is first to be made based on an evaluation of sensor signals which were received in the sensor direction from the x-y plane.

FIG. 1 shows a vehicle 100 including 2-axial (i.e. 2-channel) upfront sensors 110 and 120 which sense in the x-y plane. The chosen sign convention is such that x accelerations in the direction of deceleration as well as y accelerations toward the right vehicle side are positive. It is generally advantageous for the algorithmic processing to preprocess, for example filter, to integrate, to integrate twice, etc., the measured acceleration signals (for example in sensors 110 and 120, or directly in measuring elements 125, 130, 140 and 145, or in the evaluation unit 135). In the following, XL, YL, XR and YR are to refer to correspondingly preprocessed acceleration signals. If a system having only one upfront sensor is used, XL=XR=X and YL=YR=Y applies.

Figure 2A:
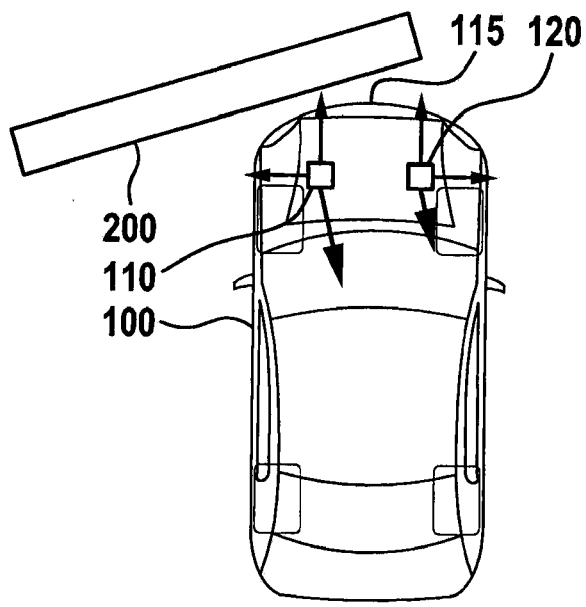
FIG. 2A schematically shows an angular impact of an object in a frontal crash.
Figure 2B:
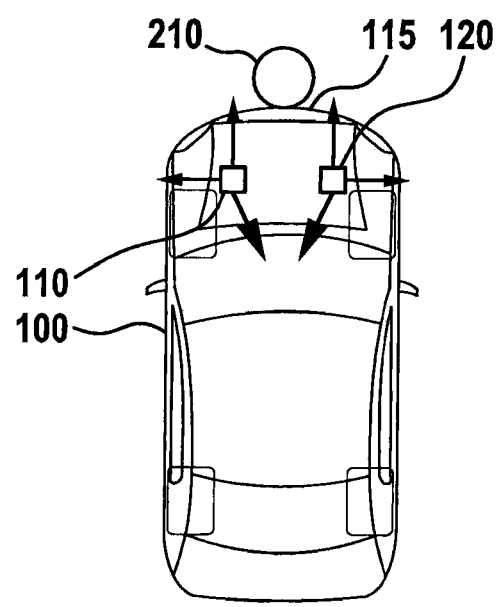
FIG. 2B schematically shows an impact of a path on the center of the vehicle in a frontal crash.
Figure 2C:
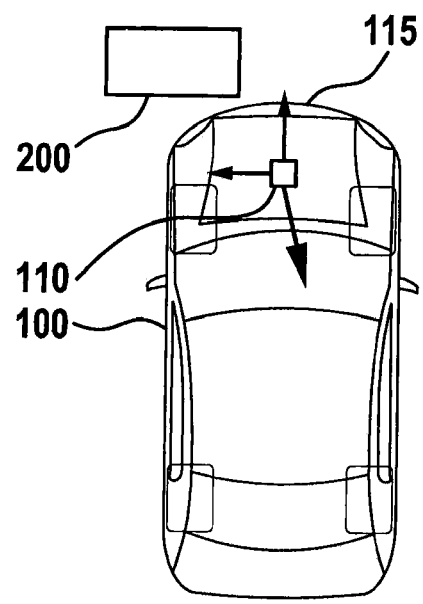
FIG. 2C schematically shows the type of shift or acceleration experienced when an object impacts the vehicle in a frontal crash.

In the subfigures of FIG. 2, the resulting force vectors are shown in the x-y plane for different crash configurations. Here, in subfigure 2A, an angular impact of an object 200 on the left frontal side of vehicle 100 is shown. First sensor 110 will thus experience a considerably larger shift or acceleration in the direction of the vehicle center than second sensor 120. The first sensor thus measures a considerably larger signal than the second sensor, but both sensors show the same algebraic sign of the detected signals in the second sensing direction.

In subfigure 2B, an impact of a path 210 on the center of front side 115 of vehicle 100 is shown, and it is apparent here that two sensors 110 and 120 are respectively shifted in the direction of the vehicle center, and thus have a portion in at least one sensor direction having different algebraic signs.

Subfigure 2C from FIG. 2 shows the type of shift or acceleration which a single sensor 110 experiences when object 200 impacts on front side 115 of vehicle 100 in the case of an only partial overlap.

In systems with 2-channel upfront sensors, along with the left and right y signals, YL and YR, the definition of two signal combinations is also appropriate:

$$Y\_sum = YL + YR \quad (1)$$

refers to the directed acceleration sum on both sensors. It is positive when the resulting y acceleration points to the right (for example, in an angular crash where the point of impact is at the left front), and it is negative when the y acceleration points to the left (for example, in an angular crash where the point of impact is at the right front).

$$Y\_surface = YL - YR \quad (2)$$

refers, however, to the surface deformation of frontal end 115 of vehicle 100, i.e., it evaluates the shift of the two upfront sensors 110 and 120 in the y direction towards each other in a crash (i.e., in case of an accident or impact of an object 200 on vehicle 100):

- if the two upfront sensors 110 and 120 move away from one another, for example, because they are pushed away to the outside by a central impact, negative values of Y_surface result.
- if both upfront sensors approach one another in the y direction, for example, by both being moved toward the center of the vehicle, positive values of Y_surface result.

Along with these y signal combinations, the following x signal combinations (i.e., combinations of sensor signal values detected in the x direction)

$$X\_sum = XL + XR \quad (3)$$

$$X\_diff = XL - XR \quad (4)$$

may be defined.

The previously defined sensor signal values and combinations thereof may now be very easily used for precisely and accurately ascertaining the resulting signal direction and strength.

In order to evaluate the crash type, ascertaining the signal direction of the acceleration vector (in the case of one single upfront sensor) or of the acceleration vectors (in the case of 2-upfront sensors) in the x-y plane suggests itself.

Figure 3:
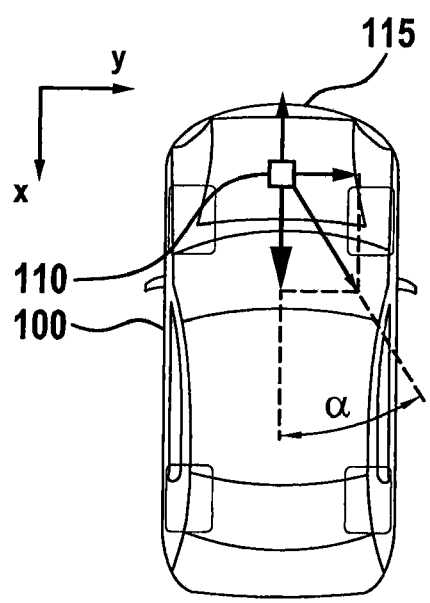
FIG. 3 shows a diagram for the definition of the angle of an angular crash.

FIG. 3 shows a top view of a vehicle for defining the angle of a crash signal. The tangent of angle α between the resulting signal direction and the longitudinal direction is provided here by the ratio of y and x accelerations and is indicated in the following by A.

In the case of a 1-upfront sensor system, the relevant variable is thus $$A = Y/X (= \tan \alpha), \quad (5)$$

while in a 2-upfront sensor system, one left and one right signal angle, as well as an angle for the entire signal, may be determined according to the following equations:

$$AL = YL/XL, \quad (6)$$

$$AR = YR/XR, \quad (7)$$

$$A\_sum = Y\_sum/X\_sum. \quad (8)$$

A type of "weighted angle difference" at the two sensors 110 and 120 may be obtained with the ratio of the preprocessed surface acceleration to the total x signal, for example, according to the equation $$A\_\text{surface} = Y\_\text{surface}/X\_\text{sum} \quad (9)$$

In the following, the term "angle" or "signal angle" or "angle signal" is always used for ratios of y accelerations to x accelerations, even when, strictly speaking, it is the tangent of an angle.

Since the y signals and x signals during the course of the crash vary over time, angles (5) through (9) also show a variation over time during the crash, i.e., they are dynamic angles. If necessary, additional processing of these angles may thus be advantageous.

Along with the angles, the amplitude of the resulting (preprocessed) signal vector is also of interest and results in $$\text{Acc} = \sqrt{Y^2 + X^2} \quad \text{(1-upfront sensor)} \quad (10)$$

$$\text{AccL} = \sqrt{YL^2 + XL^2} \quad \text{(2-upfront sensor left sensor)} \quad (11)$$

$$\text{AccR} = \sqrt{YR^2 + XR^2} \quad \text{(2-upfront sensor right sensor)} \quad (12)$$

$$\text{Acc\_sum} = \sqrt{Y\_\text{sum}^2 + X\_\text{sum}^2} \quad \text{(2-upfront sensor, total signal)} \quad (13)$$

Along with the dynamic calculation of the signal angle described above, alternatively the signal may be calculated in a fixedly predefined direction. For example, fixedly predefined 45° directions into the vehicle interior are defined in FIG. 1. For a 2-UFS system, the signal projections in these directions result from the measured signals in the x and the y direction in $$45L = (XL + YL)/\sqrt{2} \quad (14)$$

$$45R = (XR - YR)/\sqrt{2} \quad (15)$$

where factor $1/\sqrt{2}$ may be dispensed with for the sake of simplicity. The two variables 45L and 45R may also be calculated for a 1-UFS system, where XL=XR=X and YL=YR=Y then applies. Instead of an angle of 45°, other fixed angles β (deviations from the longitudinal direction x) are also conceivable. For the accelerations in these predefined directions it then applies:

$$\text{Acc\_}\beta\_L = \cos\beta \cdot XL + \sin\beta \cdot YL \quad (16)$$

$$\text{Acc\_}\beta\_R = \cos\beta \cdot XR - \sin\beta \cdot YR \quad (17)$$

Again, both variables may also be determined within the framework of a 1-UFS system. Here, β refers to a fixedly predefined measuring angle, while angle A from the previous paragraph represents a dynamic angle which describes the direction of the resulting total signal.

The values defined from sensor signal values XL, YL, XR and YR may now be used to carry out signal evaluations in fixedly predefined directions, which lead to very precise analyses of the accident scenario.

One suitable feature is also the difference between left and right signals, for example, $$45\_\text{diff} = 45L - 45R \quad (18)$$

This signal difference may also be particularly advantageously normalized to the signal sum of the two signal directions 45L+45R.

With the previously named variables or combined values it is also possible to carry out a very precise detection of predetermined crash types. In general, different crash types may now be very well characterized by the signal angles and signal strengths occurring at sensors 110 and 120. This means that various crash types may be detected very well with the following evaluation steps in activation unit 135:

Threshold value queries to the individual signal angles or signal ratios (for example, from equations (5) through (9)) compared to a threshold value (which is in the following generally abbreviated to "Thd" for threshold) as well as logical combinations thereof, and/or a combination of the threshold value queries with threshold value queries regarding the strength of preprocessed sensor signals as well as logical combinations thereof.

These sensor signals or sensor signal values may be based on single channels (1-upfront sensor: X, Y; 2-upfront sensor: XL, YL, XR, YR)

linear combinations thereof, see equations (1) through (4) and (14) through (18)

resulting signal directions, see equations (10) through (13).

The threshold value queries on the signal angle are here the main criteria for detecting the crash type, while the threshold value queries regarding the signal strengths are rather a measure for the strength of a given crash. This is to be elucidated in greater detail in the following for angular crashes and pole crashes.

Angular crashes may be particularly accurately detected using the approach presented here. An angular crash is characterized by a directed y component. Thus, for example, an angular crash on the left side shows a positive signal angle. It may thus be detected via threshold value queries of the angle variables defined in equations (5) through (8) against positive threshold values as well as logical links. For example, a left-side crash may be detected by a 2-upfront sensor system when the signal angle to the facing sensor and the signal angle of the total signal exceed positive threshold values, $$AL > \text{Thd}\_L \ \& \ A\_\text{sum} > \text{Thd}\_\text{sum} \quad (19)$$

Other logical links of AL, AR and A_sum are also conceivable. In a 1-upfront sensor system, a left-side angular crash may be detected, for example, using a threshold value query A>Thd_L.

A right-side angular crash may correspondingly be detected, when the inverted signal angles exceed positive threshold values, meaning, in a 2-upfront sensor system for example with the analogous query $$-AR > \text{Thd}\_R \ \& \ -A\_\text{sum} > \text{Thd}\_\text{sum} \quad (20)$$

or with the query −A>Thd_R in a 1-upfront sensor system. In the algorithmic implementation of the threshold value queries it may be advantageous to circumvent the division for ascertaining the angle, and instead to vary the threshold value as a function of the denominator, for example, to replace the query AL>Thd_L with the query YL>Thd(XL), where Thd(XL) describes a functional dependency of the threshold value Thd on the input value XL. Instead of a linear correlation between threshold value Thd and XL, other functional correlations are also conceivable.

The queries of the angle variables A described above have the characteristic to only detect the direction of the crash and do not give any information about the strength of the crash. If the angular crash detection is to be limited to angular crashes of a certain minimum strength, the queries of the angles A should be supplemented with queries regarding the individual signal strengths Y, X (1-upfront sensor), YL, YR, XL, XR (2-upfront sensors), linear combinations thereof as Y_sum, or the resulting signal strengths according to equations (10) through (13). A detection of a left-side angular crash of sufficient strength then reads as an expansion of equation (19), for example, $$AL > \text{Thd\_}L \ \& \ A\_\text{sum} > \text{Thd\_sum}$$

$$\& \ (YL > \text{Thd\_}YL \ \text{OR} \ \text{Acc\_sum} > \text{Thd\_sum}) \tag{21}$$

In a 1-upfront sensor system, a left-side angular crash may then be detected with a similar logic:

$$A > \text{Thd\_}L \ \& \ (Y > \text{Thd\_}YL \ \text{OR} \ \text{Ace} > \text{Thd\_Acc}).$$

Figure 4:
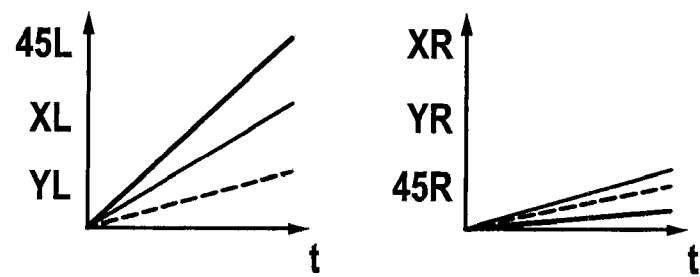
FIG. 4 shows diagrams of the schematic signal representation in the case of an angular crash on the left side.

Alternatively, angular crashes may also be detected with the aid of the previously defined 45° channels. FIG. 4 shows two diagrams in which signal curves are depicted schematically in a left-side angular crash where $45L=XL+YL$ (left diagram from FIG. 4) and $45R=XR-YR$ (right diagram from FIG. 4). In the diagrams in FIG. 4 it is apparent that the directed y component results in an amplification in an angular crash on the 45° direction facing the crash, compared to the x signal, while in the 45° direction facing away from the crash, it results in a reduction compared to the x signal. This applies similarly to a 1-UFS system for which the two directions $45L=X+Y$ and $45R=X-Y$ are defined: one signal combination is attenuated by the y component, the other is amplified. An angular crash is also characterized by a high signal on the 45° direction facing the crash and may thus be detected with the query $$45L > \text{Thd} \ \text{OR} \ 45R > \text{Thd} \tag{22}$$

where the first part of the query applies to left-side angular crashes and the second part of the query applies to right-side angular crashes. Alternatively or additionally to crash severity query (22), the crash type "angular crash" may also be evaluated using its large signal difference between the 45° signal facing the crash, and the 45° signal facing away from the crash, for example, according to the following equations $$\text{left-side crash: } 45L-45R > \text{Thd\_Angle} \tag{23}$$

$$\text{Right-side crash: } 45R-45L > \text{Thd\_Angle} \tag{24}$$

Advantageously, the difference signal in equation (23) and (24) may be normalized to the sum signal $45L+45R$, or the threshold value may be varied as a function of the sum signal $45L+45R$.

The approach presented here also makes it possible to detect a central pole crash very well. Central pole crashes, which impact the car between the two upfront sensors, often show only a weak signal in classical upfront sensor systems having sensing direction x. In two-axial upfront sensors, such as first sensor 110 used here and second sensor 120, pole crashes may now be detected using their characteristic surface deformation. Depending on the front-end structure and the installation point of the upfront sensors, due to centrally impacting pole 210 (for example, as shown in the diagram of FIG. 2B), either both upfront sensors are pushed away toward the side (case A: YL negative, YR positive, Y_surface negative), or the vehicle front end "wraps" around the pole and both upfront sensors are pulled inward (case B: YL positive, YR negative, Y_surface positive).

Figure 5:
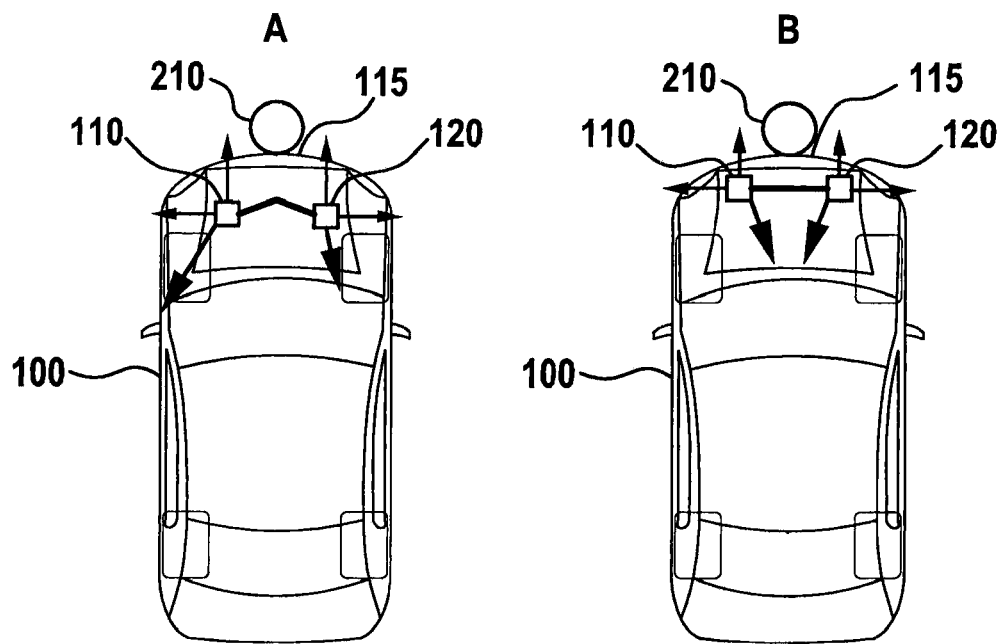
FIG. 5 shows two diagrams of the two possible deformation situations of the vehicle front depending on the vehicle structure in the case of a pole crash.

FIG. 5 shows two diagrams of the two situations possible in the case of a pole crash (depending on the vehicle structure). In the left diagram in FIG. 5 (case A), a movement of first and second upfront sensors 110 and 120 toward the outside in the y direction is apparent (for example, in the case of a very rigid vehicle structure), while in the right diagram from FIG. 5 (case B), a movement of first and second upfront sensors 110 and 120 toward the inside in the y direction is apparent.

A central pole crash is thus characterized by the different angle algebraic signs on both sides, but in similar angle sizes. This is apparent by individual complementary angle queries on both sides:

$$\text{Case } A: -AL > \text{Thd\_Pole} \ \& \ AR > \text{Thd\_Pole} \tag{25}$$

$$\text{Case } B: AL > \text{Thd\_Pole} \ \& \ -AR > \text{Thd\_Pole} \tag{26}$$

Alternatively to the complementary angle queries, a query on the weighted angle difference (9) is also conceivable. Thus the pole recognition is as follows:

$$\text{Case } A: -A\_\text{surface} > \text{Thd\_surface} \tag{27}$$

$$\text{Case } B: A\_\text{surface} > \text{Thd\_surface} \tag{28}$$

Instead of establishing a quotient in A_surface, equation (9), it may also be appropriate to carry out threshold value queries (27) and (28) with Y_surface instead of with A_surface and vary the threshold value as a function of X_sum or also Y_sum during the process.

In order to activate or trigger the one or multiple passenger protection means, the rest of the triggering algorithm of the passenger protection means may now also be influenced. The previously described method of detecting the crash type "angular crash" or "pole crash" may now be used in order to adapt the rest of the algorithm in its sensitivity to the detected crash type. Generally, two variants are conceivable here:
 a) influencing the upfront algorithm, which is still working on the x signals and which in turn influences the main algorithm working on the central x signal (i.e., the signal which represents a physical variable in the longitudinal vehicle direction).
 b) directly influencing or modifying one or multiple parameters of the main algorithm.

A main algorithm may here, for example, be understood to mean an algorithm which, along with the mentioned sensor signal values, also processes values, which, for example, represent other physical variables.

While in variant a) a crash type query alone as, for example, the angular queries in (11) or (12) are in principle sufficient, in variant b) a linking with signal strength queries as in equation (13) is appropriate.

In principle, all explanations in the previous section may also be applied to signals measured in the x-z plane, and thus crashes with a defined z component may be detected. If, for example, the positive z direction is defined upward, misuse tests such as driving over the curb may be detected using a particular minimum value of acceleration in the z direction as well as a particular angle between z signal and x signal, for example, using the query combination $$Z > \text{Thd\_curb} \ \& \ Z/X > \text{Thd\_}z\_\text{Angle} \tag{29}$$

In the case of truck underrides, on the other hand, (depending on the installation location) it is expected for the upfront sensors to be pushed down. In, for example, a 2-upfront sensor system this may be recognized using queries such as $$(-ZL > \text{Thd\_Underride} \ \text{OR} \ -ZR > \text{Thd\_Underride})$$

$$\&$$

$$(-ZL/XL > \text{Thd\_Angle-Underride} \ \text{OR} \ -ZR/XR >$$

$$\text{Thd\_Angle\_Underride}) \tag{25}$$

where truck underrides with a partial overlap may also be recognized using the OR variation of the equation of left and right features.

Figure 6:
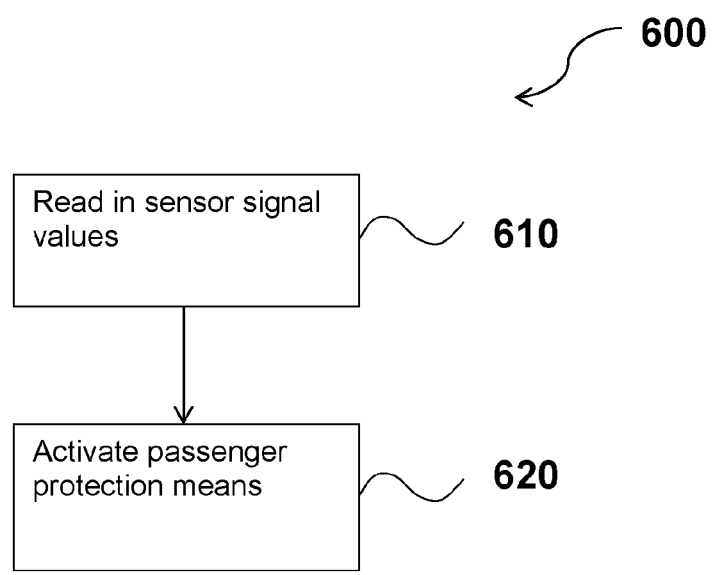
FIG. 6 shows a flow chart of a method according to one exemplary embodiment of the present invention.

FIG. 6 shows a flow chart of one exemplary embodiment of the approach presented here as method 600 for triggering at least one passenger protection means of a vehicle. Method 600 includes a step 610 of reading in a first and a second sensor signal value of a first sensor, which is situated at a first location in the vehicle and, if necessary, reading in a third and a fourth sensor signal value of a second sensor, which is situated at a second location in the vehicle which is different from the first location. The first sensor signal value represents a physical variable detected in a first sensor direction, and the second sensor signal value represents a second physical value detected in a second sensor direction which is different from the first sensor direction. The third sensor signal value represents a third physical variable detected in the first sensor direction, and the fourth sensor signal value represents a fourth physical variable detected in the second sensor direction. Furthermore, method 600 includes a step 620 of activating the passenger protection means using the first and the second and/or third and fourth sensor signal values.

The exemplary embodiments described here and illustrated in the figures are selected only as examples. Different exemplary embodiments may be combined with each other completely or in regard to individual features. One exemplary embodiment may also be supplemented by features of another exemplary embodiment.

Furthermore, the method steps presented here may also be repeated or carried out in a sequence different from the sequence described.

If one exemplary embodiment includes an "and/or" link between a first feature and a second feature, this is to mean that the exemplary embodiment according to one specific embodiment includes both the first and the second feature, and according to another specific embodiment includes only the first feature or only the second feature.

What is claimed is:

1. A method for triggering at least one passenger protection unit of a vehicle, comprising: reading in at least a first and a second sensor signal values of a first sensor which is situated at a first location in the vehicle, the first sensor signal value representing a first physical variable detected in a first sensor direction, and a second sensor signal value representing a second physical variable detected in a second sensor direction which is different from the first sensor direction; and activating the passenger protection unit using at least the first and the second sensor signal value; wherein, during the step of reading in, a third and a fourth sensor signal values are additionally read in by a second sensor which is situated at a second location in the vehicle which is different from the first location, the third sensor signal value representing a third physical variable detected in the first sensor direction, and the fourth sensor signal value representing a fourth physical variable detected in the second sensor direction, wherein the passenger protection unit is activated additionally taking into account the third and the fourth sensor signal value, and wherein the passenger protection unit is activated on the basis of at least one linear combination of at least two of the first, second, third and fourth sensor signal values.

2. The method as recited in claim 1, wherein sensor signal values which represent accelerations as a physical variable are read in the step of reading in.

3. The method as recited in claim 1, wherein at least one of: (i) a physical variable detected in the driving direction of the vehicle is read in as at least one of the sensor signal value and the third sensor signal value; and (ii) one of (a) a physical variable detected transversely to the driving direction of the vehicle is read in as at least one of the second sensor signal value and the fourth sensor signal value, or (b) a physical variable detected perpendicularly to a direction of travel, on which the vehicle is driving, is read in as the second sensor signal value and the fourth sensor signal value.

4. The method as recited in claim 1, wherein at least one of: (i) one of a first angle signal or a first linear combination is determined using the first and the second sensor signal in the step of activating; and (ii) a second angle signal is detected using the third and the fourth sensor signal value, the passenger protection unit being activated on the basis of at least one of the first and the second angle signal.

5. The method as recited in claim 4, wherein an angular impact of an object on the vehicle is detected in the step of activating when at least one of the first angle signal and the second angle signal is within a predetermined range of an angle threshold value.

6. The method as recited in claim 4, wherein an angular impact of an object on the vehicle is detected in the step of activating if at least one of: (i) the first angle signal is within a predetermined range of a first reference threshold value; (ii) a linear combination of the first, second, third and fourth sensor signal values within a predetermined range of a second reference threshold value; (iii) a negated second angle signal is within a predetermined range of a third reference threshold value; and (iv) a linear combination of the first, second, third and fourth sensor signal values is within a predetermined range of the second reference threshold value.

7. A method for triggering at least one passenger protection unit of a vehicle, comprising: reading in at least a first and a second sensor signal value of a first sensor which is situated at a first location in the vehicle, the first sensor signal values representing a first physical variable detected in a first sensor direction, and a second sensor signal value representing a second physical variable detected in a second sensor direction which is different from the first sensor direction; and activating the passenger protection unit using at least the first and the second sensor signal value; wherein, during the step of reading in, a third and a fourth sensor signal values are additionally read in by a second sensor which is situated at a second location in the vehicle which is different from the first location, the third sensor signal value representing a third physical variable detected in the first sensor direction, and the fourth sensor signal value representing a fourth physical variable detected in the second sensor direction, wherein the passenger protection unit is activated additionally taking into account the third and the fourth sensor signal value, wherein the passenger protection unit is activated on the basis of at least one linear combinations of at least two of the first, second, third and fourth sensor signal values; wherein a central direct impact of an object on the vehicle is detected in the step of activating if at least one of: (i) the first angle is within a predetermined range of a first angle threshold value and a negated second angle is within a predetermined range of one of the first angle threshold value or with a second angle threshold value; and (ii) a quotient of a difference between the second and fourth sensor signal values and a sum of the first and third sensor signal values is within a predetermined range of a threshold value corresponding to a lateral shift of the first and second sensors, and wherein the passenger protection unit is activated in response to the detected central direct impact.

8. The method as recited in claim 1, wherein the first and third sensor signal values are linked to a first combination of sensor signal values in the step of activating, and the second and fourth sensor signal values are linked to a second combination of sensor signal values, and wherein the passenger protection unit is activated on the basis of at least one of the first and second combinations of sensor signal values.

9. The method as recited in claim 8, wherein one of a combination angle or a combination ratio is determined in the step of activating using the first and second combination values, and wherein the passenger protection unit is activated on the basis of one of the combination ratio or the combination angle.

10. The method as recited in claim 1, wherein the passenger protection unit is activated in the step of activating based on at least one sensor signal strength value determined using at least one of: (i) a square root of a sum of the squared first sensor signal value and the squared third sensor signal value; (ii) a square root of a sum of the squared second sensor signal value and the squared fourth sensor signal value; and (iii) a square root of a sum of the squared sum of the first and third sensor signal values and the squared sum of the second and fourth sensor signal values.

11. A device for triggering at least one passenger protection unit of a vehicle, comprising: a control unit including a processor configured to perform the following: reading in at least a first and a second sensor signal values of a first sensor which is situated at a first location in the vehicle, the first sensor signal value representing a first physical variable detected in a first sensor direction, and a second sensor signal value representing a second physical variable detected in a second sensor direction which is different from the first sensor direction; and activating the passenger protection unit using at least the first and the second sensor signal value; wherein, during the step of reading in, a third and a fourth sensor signal values are additionally read in by a second sensor which is situated at a second location in the vehicle which is different from the first location, the third sensor signal value representing a third physical variable detected in the first sensor direction, and the fourth sensor signal value representing a fourth physical variable detected in the second sensor direction, and wherein the passenger protection unit is activated additionally taking into account the third and the fourth sensor signal value, and wherein the passenger protection unit is activated on the basis of at least one linear combinations of at least two of the first, second, third and fourth sensor signal values.

12. A non-transitory, computer-readable data storage medium storing a computer program having program codes which, when executed on a computer, perform a method for triggering at least one passenger protection unit of a vehicle, the method comprising: reading in at least a first and a second sensor signal values of a first sensor which is situated at a first location in the vehicle, the first sensor signal value representing a first physical variable detected in a first sensor direction, and a second sensor signal value representing a second physical variable detected in a second sensor direction which is different from the first sensor direction; and activating the passenger protection unit using at least the first and the second sensor signal value; wherein, during the step of reading in, a third and a fourth sensor signal values are additionally read in by a second sensor which is situated at a second location in the vehicle which is different from the first location, the third sensor signal value representing a third physical variable detected in the first sensor direction, and the fourth sensor signal value representing a fourth physical variable detected in the second sensor direction, wherein the passenger protection unit is activated additionally taking into account the third and the fourth sensor signal value, and wherein the passenger protection unit is activated on the basis of at least one linear combinations of at least two of the first, second, third and fourth sensor signal values.

13. The method as recited in claim 1, wherein the physical variable is one of: an acceleration, a force or a pressure.

* * * * *